United States Patent
Ben-David et al.

(10) Patent No.: US 7,313,788 B2
(45) Date of Patent: Dec. 25, 2007

(54) VECTORIZATION IN A SIMDD DSP ARCHITECTURE

(75) Inventors: Shay Ben-David, Haifa (IL); Dorit Naishlos, Haifa (IL); Uzi Shvadron, Misgav (IL); Ayal Zaks, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 787 days.

(21) Appl. No.: 10/695,970

(22) Filed: Oct. 29, 2003

(65) Prior Publication Data

US 2005/0097301 A1    May 5, 2005

(51) Int. Cl.
*G06F 9/45* (2006.01)
*G06F 7/00* (2006.01)
*G06F 15/80* (2006.01)

(52) U.S. Cl. .............. 717/150; 717/140; 717/149; 717/160; 712/10; 712/22; 712/9

(58) Field of Classification Search .......... 717/160
See application file for complete search history.

(56) References Cited

U.S. PATENT DOCUMENTS

| | | | |
|---|---|---|---|
| 6,446,105 B1 * | 9/2002 | Washio et al. ............ | 708/520 |
| 6,625,720 B1 * | 9/2003 | Ansari ..................... | 712/4 |
| 6,665,790 B1 | 12/2003 | Glossner et al. | |
| 6,675,374 B2 * | 1/2004 | Pieper et al. ............ | 717/141 |
| 6,915,411 B2 | 7/2005 | Moreno et al. | |
| 7,017,028 B2 * | 3/2006 | Ben-David et al. ...... | 711/220 |
| 7,130,985 B2 * | 10/2006 | Barlow et al. ........... | 712/9 |
| 2003/0167387 A1 * | 9/2003 | Ansari ..................... | 712/4 |
| 2004/0006667 A1 * | 1/2004 | Bik et al. ................. | 711/100 |
| 2004/0078554 A1 | 4/2004 | Glossner et al. | |
| 2005/0055536 A1 * | 3/2005 | Ansari ..................... | 712/4 |

OTHER PUBLICATIONS

Annavaran, Murali; Patel, Jignesh M.; Davidson, Edward S.; "Data Prefetching by Dependence Graph Precomputation", p. 52-61, 2001 IEEE, retrieved Jan. 23, 2007.*
Corbal, Jesus; Espasa, Roger; Valers, Mateo; "Three Dimensional Memory Vectorization for High Bandwidth Media Memory Systems", p. 149-160, 2002 IEEE, retrieved Jan. 23, 2007.*
Lorenz, Markus; Wehemeyer, Lars; Drager, Thorsten; "Energy aware Compilation for DSPs with SIMD Instructions", p. 94-101, 2002 ACM, retrieved Jan. 23, 2007.*
Torrellas, Josph; Xia, Chun; Daigle, Russell L.; "Optimizing the Instruction Cache Performance of the Operating System", 1998 IEEE, retrieved Jan. 23, 2007.*
Preeti Ranian Panda, Nikil D. Dutt, and Alexandru Nicolau. "Efficient utilization of sratch-pad memory in embedded processor applications", in European Design and Test Conf., Mar. 1997.

(Continued)

*Primary Examiner*—Mary Steelman

(57) ABSTRACT

A method for determining vectorization configurations in a computer processor architecture, the method including identifying a vectorizable loop in a computer program, identifying a memory access pattern of data required for implementing the loop in the architecture, computing a set of candidate configurations of resources required for vectorizing the data in the architecture, where the computing step includes configuring a vector pointer register of the architecture in support of either of reorder-on-read use and reorder-on-write use of a vector element file of the architecture, selecting one of the candidates in accordance with predefined selection criteria, and implementing the selected vectorization configuration in the architecture.

33 Claims, 17 Drawing Sheets

OTHER PUBLICATIONS

Keith D. Cooper, Timothy J. Harvey. "Compiler controlled Memory", Eighth Int. Conf. on Architectural Support for Programming Languages and Operating Systems, pp. 100-104, Oct. 1998.

Masaaki Kondo, Hideki Okawara, Hiroshi Nakamaru, Taisuke Boku. "SCIMA: Software Controlled Integrated Memory Architecture for High-Performance Computing", http://citeseer.nj.nec.com/376639.html, 2000.

William Y. Chen, Roger Bringmann, Scott A. Mahlke, Richard E. Hank, James E. Sicolo. "An Efficient Architecture for Loop Based Data Preloading", 25th Annual International Symposium on Microarchitecture (1992) http://citeseer.nj.nec.com/chen92efficient.html.

Matthew A. Postiff, Trevor Mudge. "Smart Register Files for High Performance Microprocessors". http://citeseer.nj.nec.com/postiff99smart.html, 1999.

Matthew A. Postiff, David Greene, Steve Raasch, Trevor Mudge. "Integrating Superscalar Processor Components to Implement Register Caching". http://citeseer.nj.nec.com/468226.html, 2001.

Jesus Corbal, Roger Espasa, and Mateo Valero. "Exploiting a new level of DLP in multimedia applications", in Intl. Symposium on Microarchitecture, pp. 72-79, 1999.

Huy Nguyen and Lizy Kurlan John. "Exploiting SIMD parallelism in DSP and multimedia algorithms using the AltiVec technology", in Intl. Conf. on Supercomputing, pp. 11-20 1997.

A. J. C. Bik, M. Girkar, P. M. Grey, and X. Tian. "Efficient exploitation of parallelism on Pentium III and Pentium 4 processor-based systems", Intel Technology J., Feb. 2001.

Andreas Krail and Sylvain Lelait. "Compilation techniques for multimedia processors", Intl. J. of Parallel Programming, 28(4):347-361, 2000.

Samuel Larsen, Emmet Witchel, and Saman Amarasinghe. "Techniques for increasing and detecting memory alignment", Technical Memo 621, MIT LCS, Nov. 2001.

David Callahan et al. "Improving Register Allocation for Subscripted Variables", Proceedings of the ACM SIGPLAN '90 Conference on Programming Language Design and Implementation, White Plains NY, Jun. 20-22, 1990.

Kandemir et al., "Optimizing Inter-Nest Data Locality", CASES 2002, Oct. 8-11, 2002, Grenoble, France.

Doshi et al., "Optimizing Software Data Prefetches with Rotating Registers", IEEE 2001, 257-267.

Jaewook Shin et al., "Compiler-Controlled Caching in Superword Register Files for Multimedia Extension Architectures", in Int. Conf. on Parallel Architectures and Compiler Techniques, pp. 45-55, 2002.

Keith Cooper et al., "Cross-loop Reuse Analysis and its Application to Cache Optimizations", Lecture Notes In Computer Science; vol. 1239 archive Proceedings of the 9th International Workshop on Languages and Compilers for Parallel Computing, pp. 1-19, 1996.

* cited by examiner

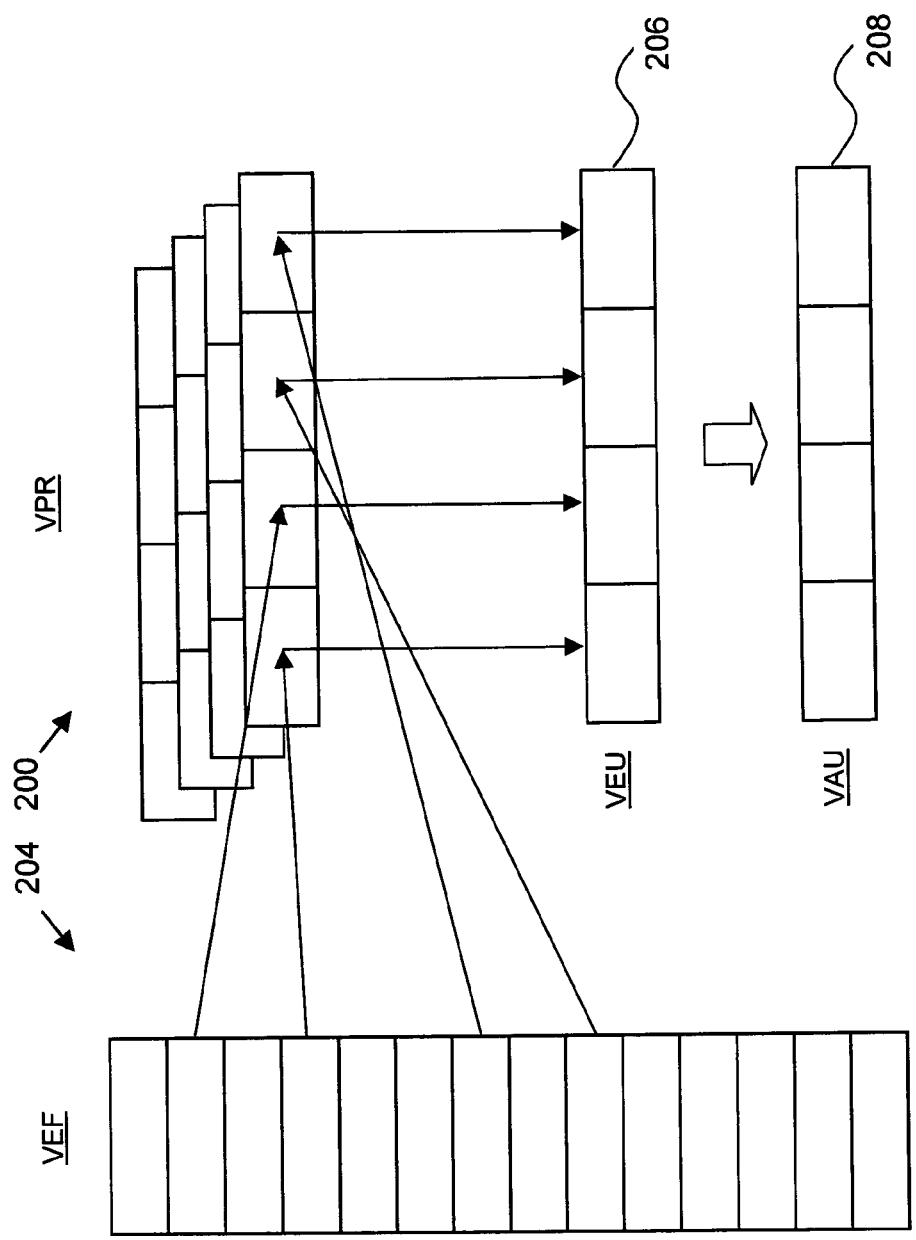

VECTORIZATION IN A SIMDD DSP ARCHITECTURE

FIELD OF THE INVENTION

The present invention relates to computer processor architecture in general, and in particular to Single Instruction Multiple Data (SIMD) processor architecture and vectorization therefor.

BACKGROUND OF THE INVENTION

Modern Digital Signal Processors (DSP) aim to combine high performance execution with low power consumption. In particular, they exploit the natural parallelism present in signal processing applications by simultaneously executing the same instruction on multiple data elements. This Single Instruction Multiple Data (SIMD) model usually requires that operands be packed in advance in "vector" registers.

Programmers and optimizing compilers use vectorization techniques to exploit the SIMD capabilities of DSP architectures. Such techniques reveal temporal and spatial locality in scalar source code and transform groups of scalar instructions into vector instructions. It is often very complicated to apply vectorization techniques to DSP architectures, as they typically have scarce resources with tight interdependencies between them. Vectorization is often further impeded by the memory architecture, which typically provides access to contiguous memory items only, and may suffer from additional memory alignment restrictions, while DSP computations may require access to data elements in an order that is neither contiguous nor memory-aligned. Packing data elements into and out of vector registers is usually done with special gather, scatter or permute instructions, which incur additional performance penalties and increase complexity.

Vectorization techniques that are adapted for use with DSP architectures and that overcome problems associated with conventional vectorization techniques would therefore be advantageous.

SUMMARY OF THE INVENTION

The present invention provides improved vectorization techniques for use with DSP architectures employing a vector-element register file that is accessible indirectly through vector pointers. The present invention supports Single Instruction Multiple disjoint Data (SIMdD) instructions, as well as traditional Single Instruction Multiple packed Data (SIMpD) instructions that operate on vector registers.

In one aspect of the present invention a method is provided for determining vectorization configurations in a computer processor architecture, the method including identifying a vectorizable loop in a computer program, identifying a memory access pattern of data required for implementing the loop in the architecture, computing a set of candidate configurations of resources required for vectorizing the data in the architecture, where the computing step includes configuring a vector pointer register of the architecture in support of either of reorder-on-read use and reorder-on-write use of a vector element file of the architecture, selecting one of the candidates in accordance with predefined selection criteria, and implementing the selected vectorization configuration in the architecture.

In another aspect of the present invention any of the steps are implemented by a compiler.

In another aspect of the present invention the computing step includes configuring any of the vector pointer registers in support of loading a data vector into a plurality of non-contiguous segments of the vector element file of the architecture.

In another aspect of the present invention the computing step includes configuring any of the vector pointer registers in support of loading a data vector into the vector element file of the architecture in support of a plurality of operations where each operation has a different access pattern.

In another aspect of the present invention the method further includes performing any of the steps for a plurality of vectorizable loops in the same computer program, detecting a data reuse opportunity common to two or more of the loops, and modifying any of the candidate configuration in support of the data reuse opportunity.

In another aspect of the present invention the method further includes eliminating any of the candidates in accordance with predefined elimination criteria.

In another aspect of the present invention the eliminating step includes eliminating any of the candidates that requires loading a data vector into the vector element file in a manner that cannot be accommodated by the vector element file.

In another aspect of the present invention the selecting step includes selecting one of the candidate configurations that uses fewest vector pointer registers among all of the candidates.

In another aspect of the present invention a method is provided for determining vectorization configurations in a computer processor architecture for computations that feature arbitrary parametric access, the method including identifying a loop in a computer program that accesses data indirectly, determining that indices of the loop fit within the range of a vector element file of the architecture, and, if so loading all loop data into the vector element file, loading the indices into at least one vector pointer register of the architecture in support of reorder-on-read use of the vector element file, and vectorizing the loop data.

In another aspect of the present invention the identifying step includes identifying the loop as performing a plurality of computations that operate in parallel on a permutation of data.

In another aspect of the present invention where any of the steps are implemented by a compiler.

In another aspect of the present invention a system is provided for determining vectorization configurations in a computer processor architecture, the system including means for identifying a vectorizable loop in a computer program, means for identifying a memory access pattern of data required for implementing the loop in the architecture, means for computing a set of candidate configurations of resources required for vectorizing the data in the architecture, where the means for computing step is operative to configure a vector pointer register of the architecture in support of either of reorder-on-read use and reorder-on-write use of a vector element file of the architecture, means for selecting one of the candidates in accordance with predefined selection criteria, and means for implementing the selected vectorization configuration in the architecture.

In another aspect of the present invention any of the means are assembled with a compiler.

In another aspect of the present invention the means for computing is operative to configure any of the vector pointer registers in support of loading a data vector into a plurality of non-contiguous segments of the vector element file of the architecture.

In another aspect of the present invention the means for computing is operative to configure any of the vector pointer registers in support of loading a data vector into the vector element file of the architecture in support of a plurality of operations where each operation has a different access pattern.

In another aspect of the present invention the system further includes means for performing any of the steps for a plurality of vectorizable loops in the same computer program, means for detecting a data reuse opportunity common to two or more of the loops, and means for modifying any of the candidate configuration in support of the data reuse opportunity.

In another aspect of the present invention the system further includes means for eliminating any of the candidates in accordance with predefined elimination criteria.

In another aspect of the present invention the means for eliminating is operative to eliminate any of the candidates that requires loading a data vector into the vector element file in a manner that cannot be accommodated by the vector element file.

In another aspect of the present invention the means for selecting is operative to select one of the candidate configurations that uses fewest vector pointer registers among all of the candidates.

In another aspect of the present invention a system is provided for determining vectorization configurations in a computer processor architecture for computations that feature arbitrary parametric access, the system including means for identifying a loop in a computer program that accesses data indirectly, means for determining that indices of the loop fit within the range of a vector element file of the architecture, and, if so means for loading all loop data into the vector element file, means for loading the indices into at least one vector pointer register of the architecture in support of reorder-on-read use of the vector element file, and means for vectorizing the loop data.

In another aspect of the present invention the means for identifying is operative to identify the loop as performing a plurality of computations that operate in parallel on a permutation of data.

In another aspect of the present invention any of the means are assembled with a compiler.

In another aspect of the present invention a computer program is provided embodied on a computer-readable medium, the computer program including a first code segment operative to identify a vectorizable loop in a computer program, a second code segment operative to identify a memory access pattern of data required for implement the loop in the architecture, a third code segment operative to compute a set of candidate configurations of resources required for vectorizing the data in the architecture and configure a vector pointer register of the architecture in support of either of reorder-on-read use and reorder-on-write use of a vector element file of the architecture, a fourth code segment operative to select one of the candidates in accordance with predefined selection criteria, and a fifth code segment operative to implement the selected vectorization configuration in the architecture.

BRIEF DESCRIPTION OF THE DRAWINGS

The present invention will be understood and appreciated more fully from the following detailed description taken in conjunction with the appended drawings in which:

FIGS. 2A-2F are simplified conceptual illustrations of exemplary methods of using the DSP architecture of FIGS. 1A and 1B, operative in accordance with preferred embodiments of the present invention;

DETAILED DESCRIPTION OF PREFERRED EMBODIMENTS

Figure 1A:
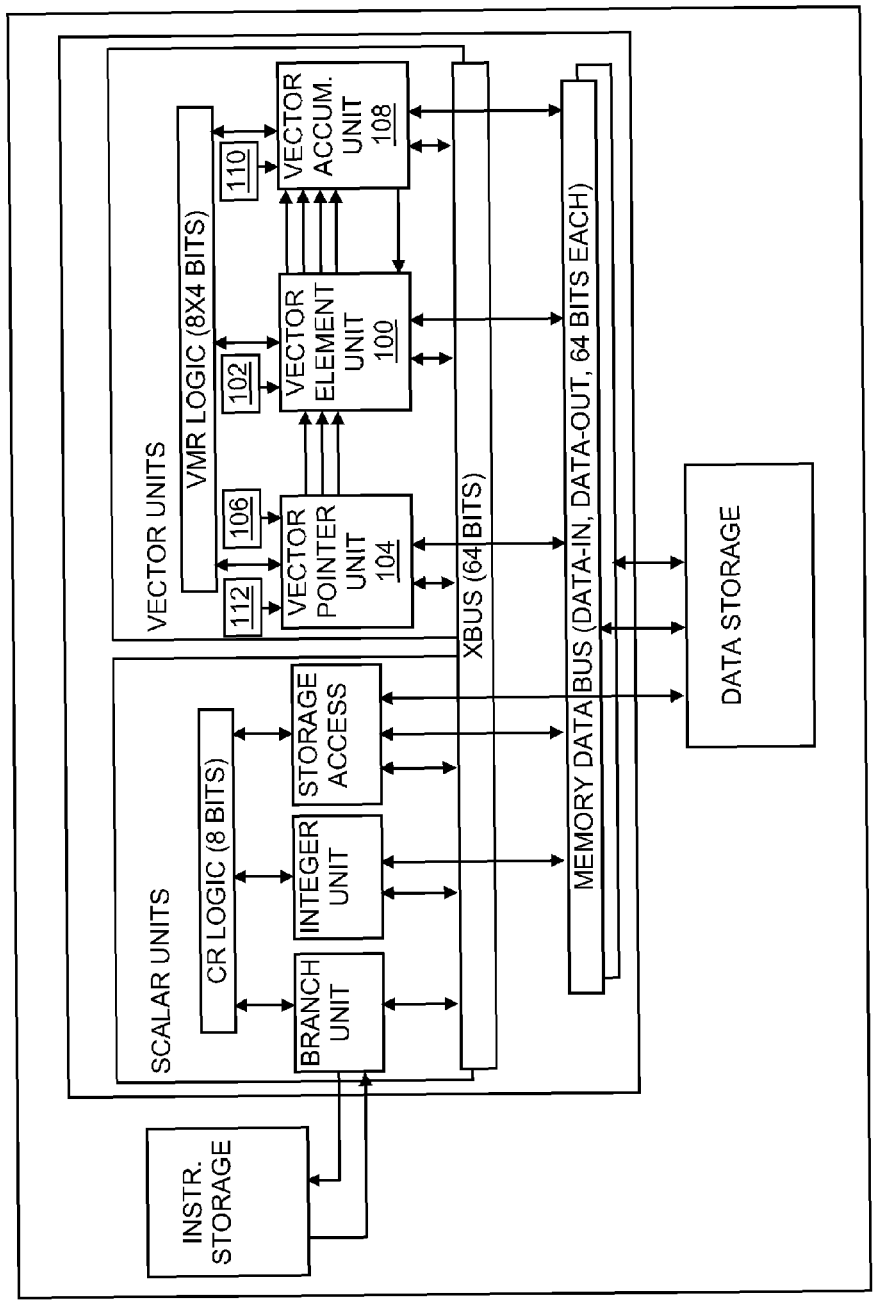
FIG. 1A is a simplified block diagram of a DSP architecture, useful in understanding the present invention.
Figure 1B:
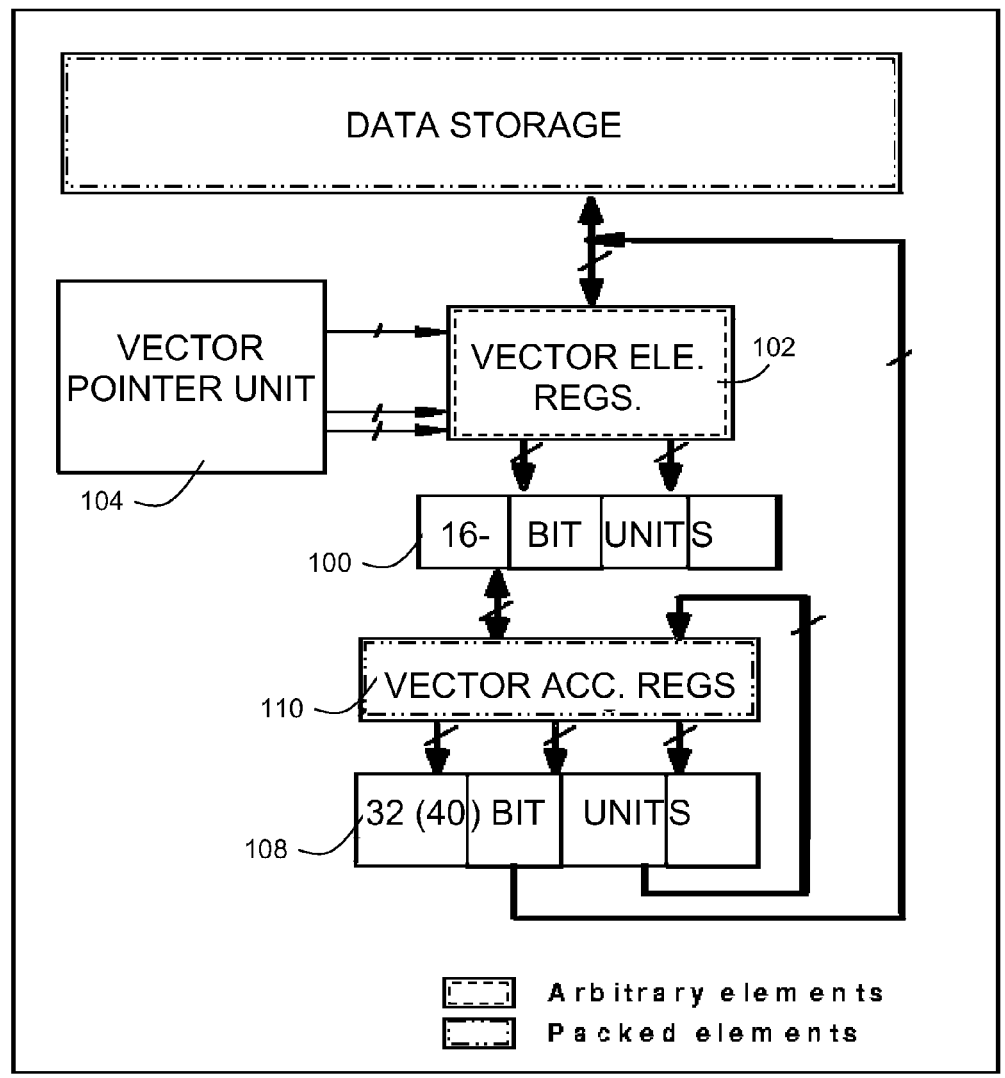
FIG. 1B is a simplified block diagram of elements of the DSP architecture of FIG. 1A.

Reference is now made to FIG. 1A, which is a simplified block diagram of a DSP architecture, and additionally to FIG. 1B, which is a simplified block diagram of elements of the DSP architecture of FIG. 1A, both useful in understanding the present invention. The architecture of FIGS. 1A and 1B is preferably a load/store RISC-like architecture, such as the eLite™ DSP architecture described in the IBM Journal of Research and Development, Vol. 2/3, March/May 2003, pp. 299-323, supporting SIMD parallelism, as well as instruction-level parallelism realized through the packing of multiple instructions into long-instruction words (LIWs). In the architecture of FIGS. 1A and 1B, a Vector Element Unit (VEU) 100 performs SIMdD operations on data stored in one or more Vector Element Registers (VER) 102. A Vector Pointer Unit (VPU) 104 typically performs SIMpD operations on one or more Vector Pointer Registers (VPR) 106, which are used to access Vector Element Registers 102. A Vector Accumulator Unit (VAU) 108 performs SIMpD operations on data in one or more Vector Accumulator Registers (VAR) 110. In addition, one or more Vector Mask Registers (not shown) support conditional execution of individual operations within a vector instruction using dynamically evaluated masks.

VEU 100 typically operates on vectors of 4 elements, with each element being a 16-bit VER 102. The elements of each vector are preferably selected from a Vector Element File (VEF) 112, typically being a multiport, scalar register file containing independently addressable elements.

The selection of elements from VEF 112 is typically indirect, via indices specified by VPRs 106. The vectors operated on by VEU 100 are thus dynamically composed and can be extensively reused by setting VPRs 106 appropriately, while VAU 108 operates on "packed" VARs 110, each typically holding 4 elements of 40-bits each.

VPRs 106 preferably index elements in VEF 112 as follows. Each VPR 106 contains one or more indices, such as four indices, each in the range of 0 to |VEF|−1. In addition, associated with each VPR 106 is a mechanism for post-incrementing the indices with modulo wrap-around. Thus, for example, a vector pointer setup by the tuple (v, ($\Delta_0$, $\Delta_1$, $\Delta_2$), $\delta$, $\rho$)

means that the indices of the vector pointer are initially set to $(v_0, v_1, v_2, v_3) = (v, v+\Delta_0, v+\Delta_0+\Delta_1, v+\Delta_0+\Delta_1+\Delta_2)$, and after post-incrementing the value of each $v_i$ becomes $v_i - (v_i \mod \rho) + ((v_i + \delta) \mod \rho)$.

For example, a vector pointer that toggles between accessing two consecutive quadruples of VERs 102 starting at address v (divisible by 8) has the setup (v, (1, 1, 1), 4, 8).

Additional instruction forms may support more general updates of the VPR indices, and a VPR can also be explicitly modified by a special instruction. All index updating preferably takes place in VPU 104, being an SIMD functional unit, with the updated indices written back into the same VPR.

Figure 2A:
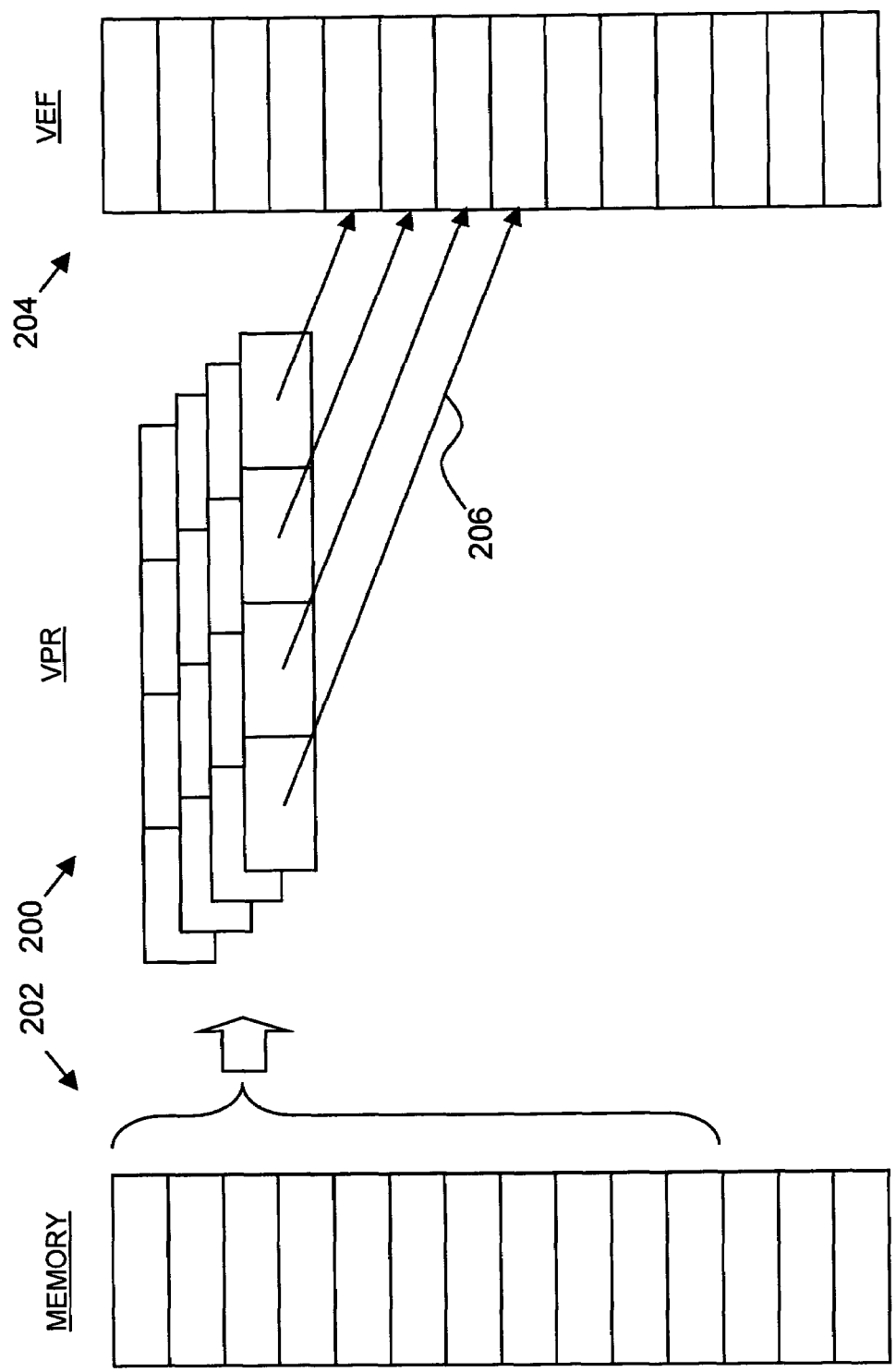

Reference is now made to FIGS. 2A-2F, which are simplified conceptual illustrations of exemplary methods of using the DSP architecture of FIGS. 1A and 1B, operative in accordance with a preferred embodiment of the present invention. In FIG. 2A, Vector Pointer Registers (VPR) 200 are used to load a data vector stored in a contiguous portion of a memory 202 into contiguous locations in a Vector Element File (VEF) 204. As is shown by arrow 206, contiguous indices in VPRs 200 point to contiguous locations in VEF 204.

Figure 2B:
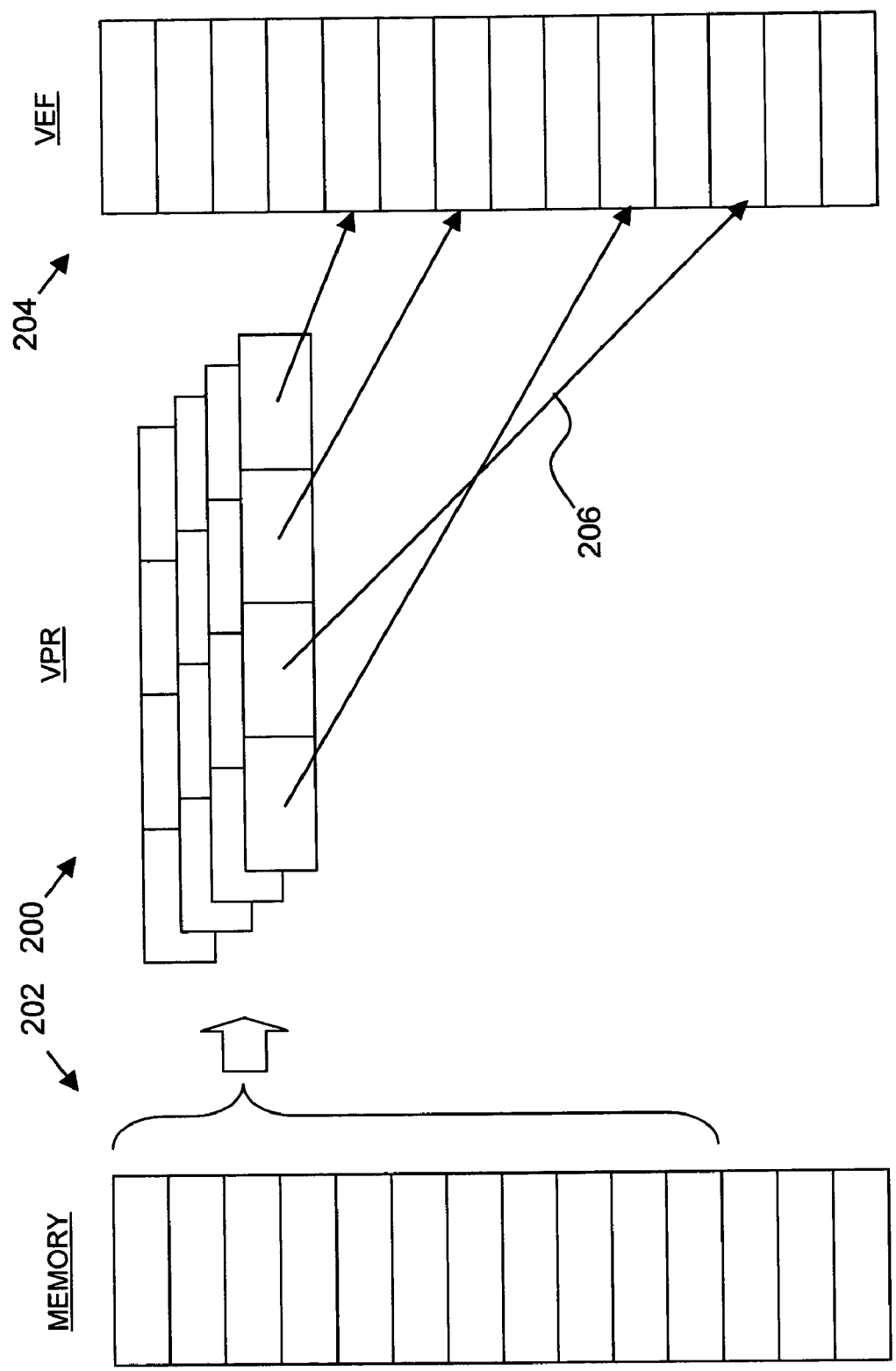

In FIG. 2B, VPRs 200 are used to load a data vector stored in a contiguous portion of memory 202 into non-contiguous locations in VEF 204. It may be seen that the values of the vector may be stored in VEF 204 in a different order than that of their storage in memory 202.

In FIG. 2C, VPRs 200 are used to load a data vector stored in contiguous locations in VEF 204 into a Vector Element Unit (VEU) 206 for computation. It may be seen that the values of the vector are provided to VEU 206 in the same order as that of their storage in VEF 204. The results of the computation is typically stored in an Vector Accumulator Unit (VAU) 208.

Figure 2D:
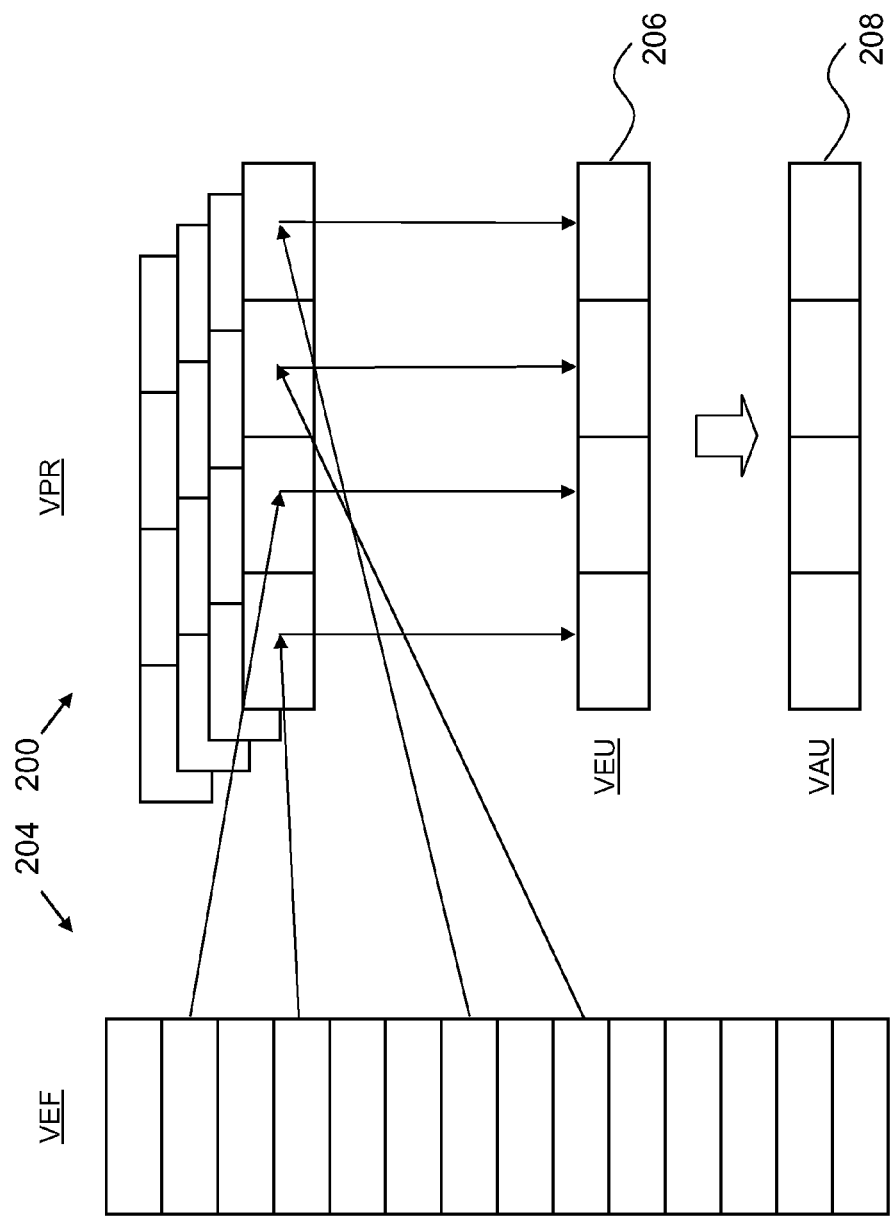

In FIG. 2D, VPRs 200 are used to load a data vector stored in non-contiguous locations in VEF 204 into a Vector Element Unit (VEU) 206 for computation. It may be seen that the values of the vector are provided to VEU 206 in a different order than that of their storage in VEF 204.

Figure 2E:
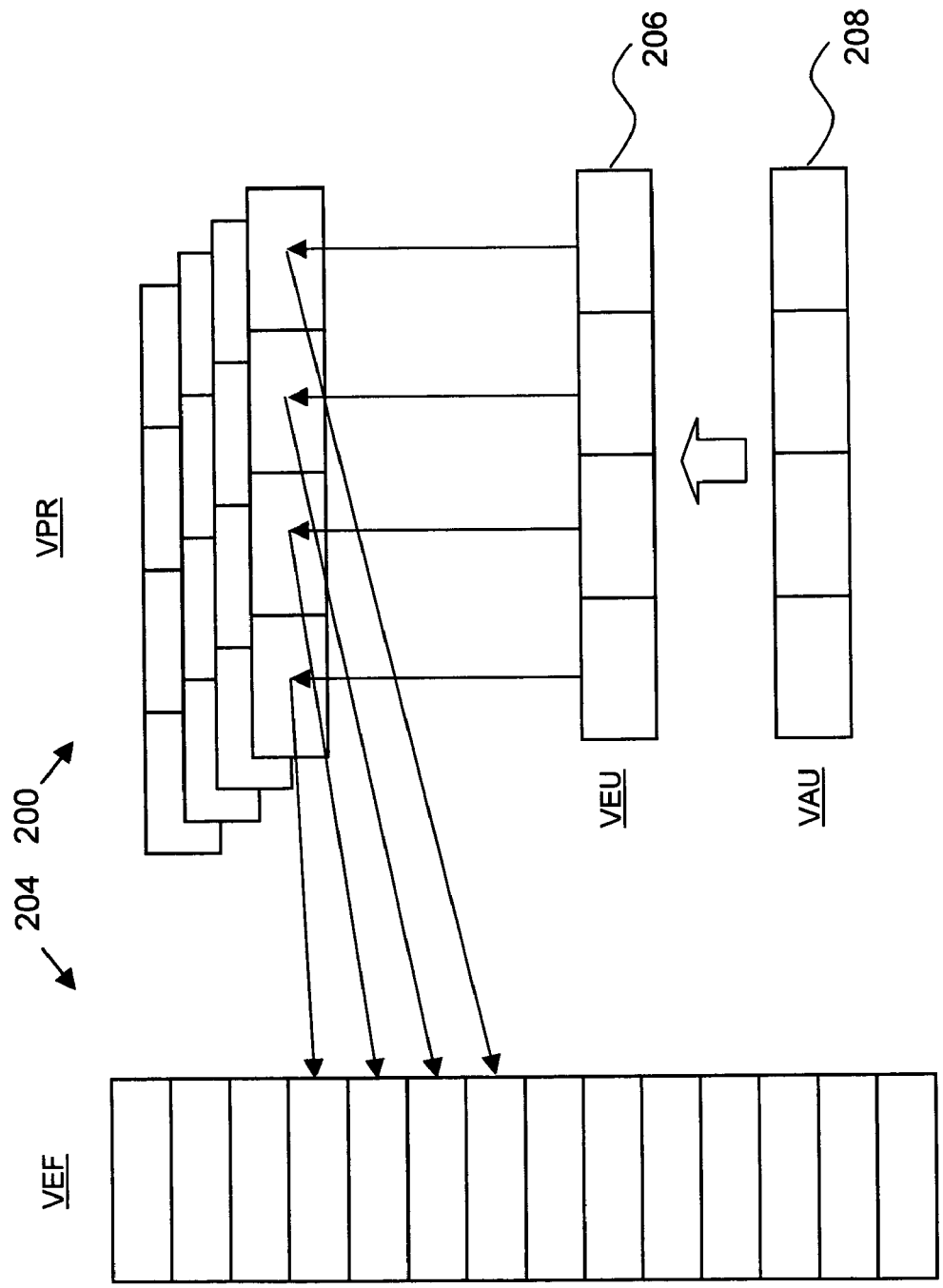

In FIG. 2E, VPRs 200 are used to load a data vector stored in VAU 208 into contiguous locations in VEF 204 via VEU 206.

Figure 2F:
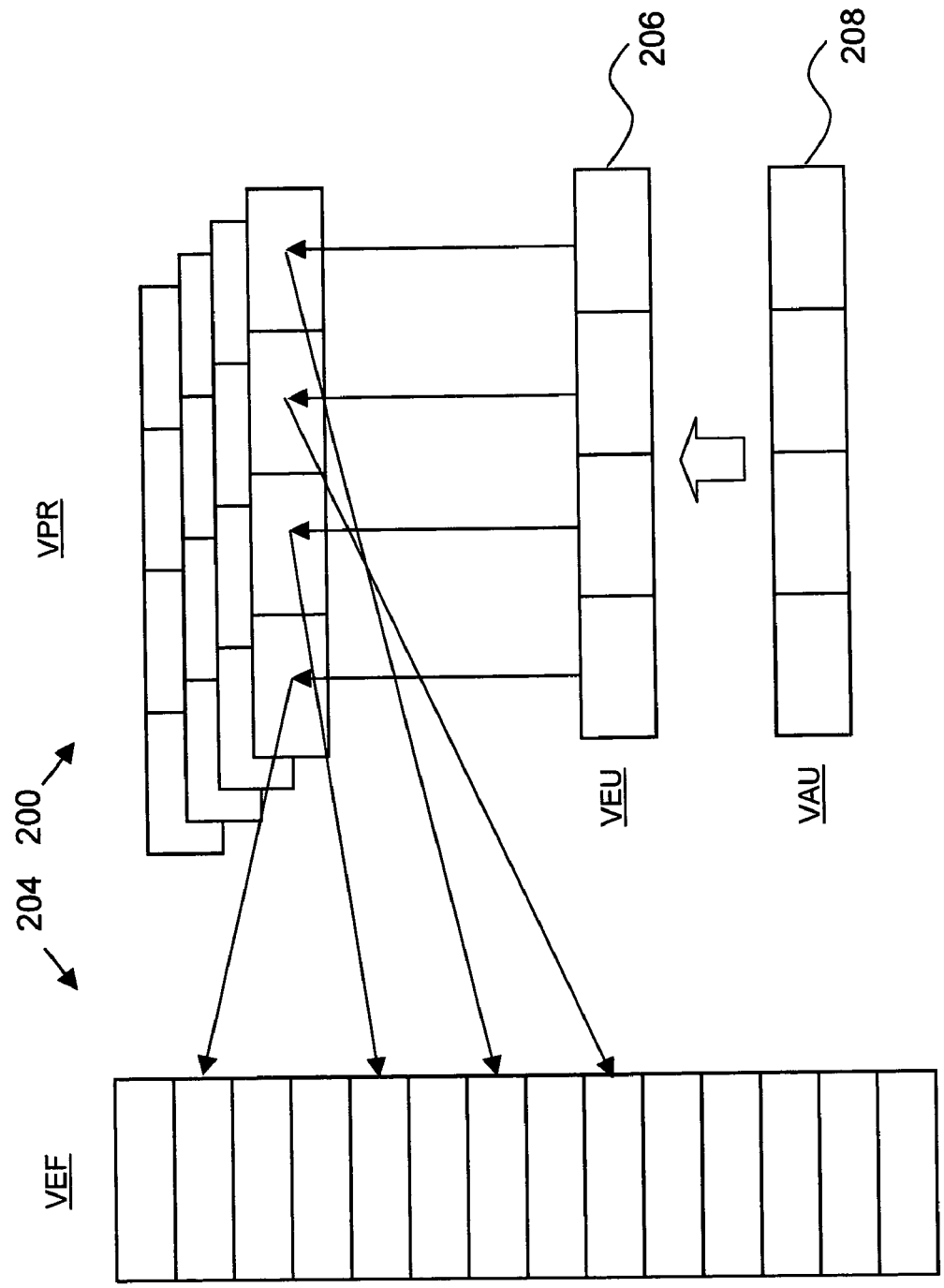

In FIG. 2F, VPRs 200 are used to load a data vector stored in VAU 208 into non-contiguous locations in VEF 204 via VEU 206. It may be seen that the values of the vector may be provided to VEF 204 in a different order than that of their storage in VAU 208.

It may thus be seen that data vector values may be written to contiguous or non-contiguous areas of VEF 204 and in the order of their storage origin or otherwise, referred to herein as "reorder on write," may be read from contiguous or non-contiguous areas of VEF 204 in their order of storage or otherwise, referred to herein as "reorder on read," or both, referred to herein as "reorder on read and write."

Figures 3A, 3B:
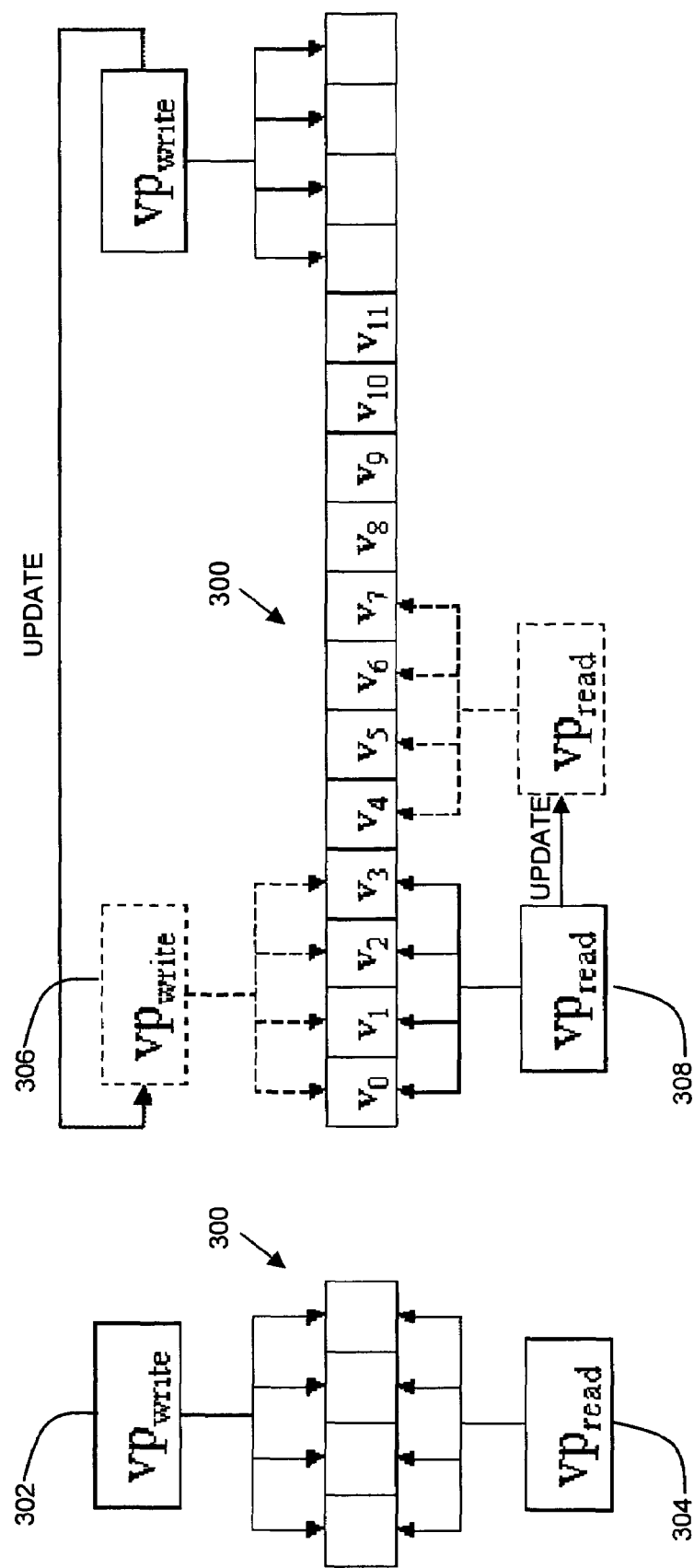
FIGS. 3A and 3B are simplified conceptual illustrations of exemplary methods of VPR configuration and use, operative in accordance with a preferred embodiment of the present invention.

Reference is now made to FIGS. 3A and 3B, which are simplified conceptual illustrations of exemplary methods of VPR configuration, operative in accordance with a preferred embodiment of the present invention. In FIGS. 3A and 3B, an array h is to be written to a VEF 300 and then read. FIG. 3A shows a possible setup of VPRs 302 and 304 for writing and reading respectively as (v, (1, 1, 1), 4, 4), where the vector pointers rotate over the same four elements. Increasing the number of elements over which the vector pointers rotate, such as 16 in (v, (1, 1, 1), 4, 16) as shown in FIG. 3B for VPRs 306 and 308, will occupy more vector registers, but will increase the distance of dependencies and enable aggressive code motion, including scheduling loads early in a software pipelined way to hide load latencies. Rotating vector register addressing is preferably provided, where each vector pointer defines the set of vector elements over which it rotates, independent of other vector pointers. The elements over which a vector pointer rotates need not be consecutive, and multiple rotating vector pointers may have elements in common. The rotation itself is activated for each vector pointer independently, and is not associated with any global instruction.

In the architecture of FIGS. 1A and 1B, hiding load latencies and performing general software-pipelining optimizations are preferably performed by placing loads in the loop prolog, extending the VEF area reserved for the array so that it could contain all the loaded elements until they are no longer required for computations, and modifying the pointer setup accordingly.

In the example in FIG. 3B, three loads can be performed by the loop prolog to pre-load twelve elements. Accordingly, the VEF allocation changes from the four elements shown in FIG. 3A to sixteen elements, providing enough space to hold data three iterations forward. The setup of the vector pointers used to read and write is also preferably modified so that the autoupdate, which advances them forward by four elements, will rewind to the beginning at the boundary of sixteen elements instead of four.

It may be seen that changing the number of registers over which to rotate is accomplished by simply changing a parameter in vector pointer setup, such as in the loop prologue, rather than reassigning registers to all relevant instructions or making other modifications within the loop. Such decisions may be taken by a compiler during scheduling (i.e., after vectorization) according to the VEF availability, or during vectorization in anticipation of future scheduling needs.

Figure 4A:
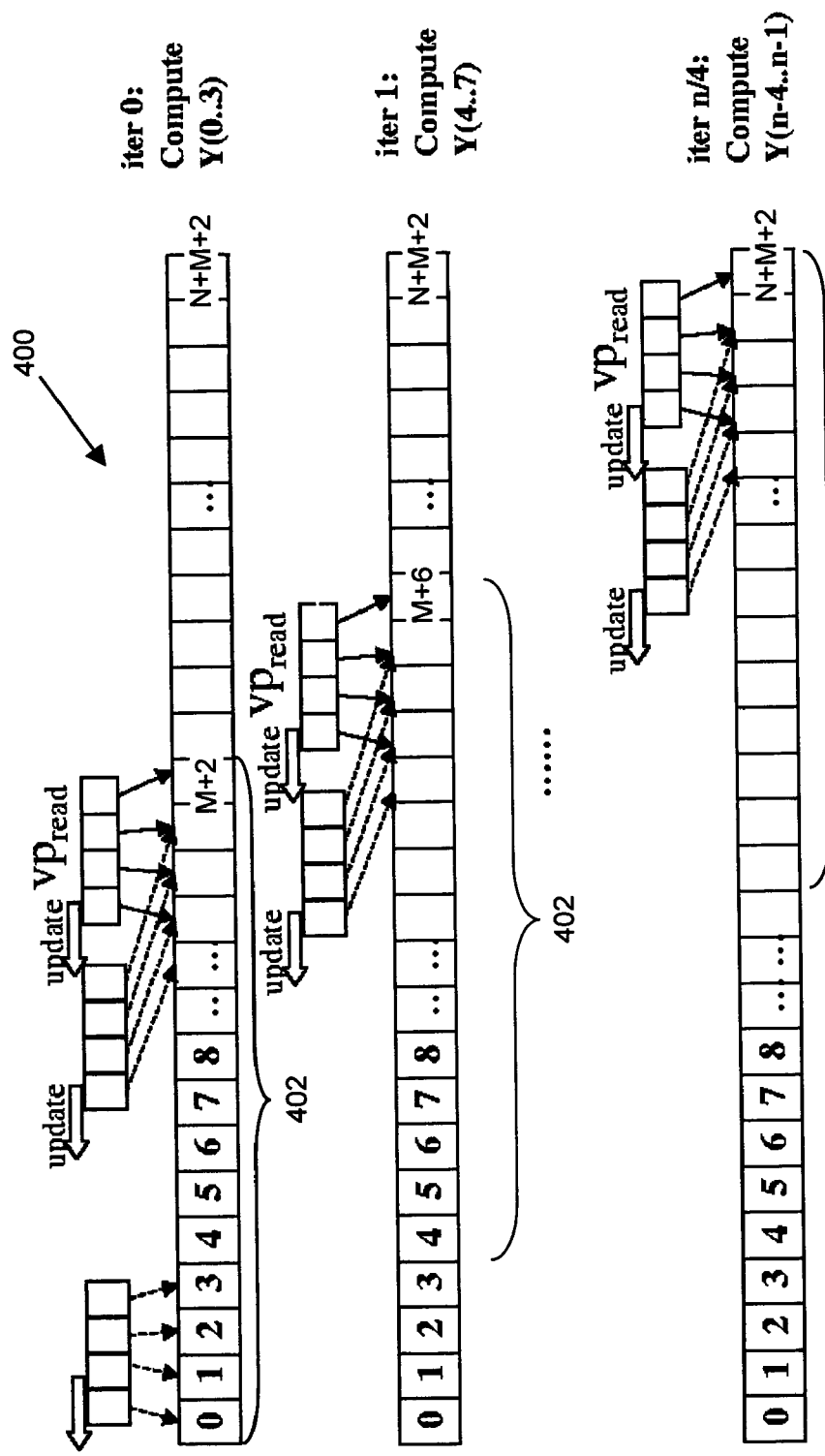
FIGS. 4A and 4B are simplified conceptual illustrations of exemplary methods of VPR configuration and use, operative in accordance with a preferred embodiment of the present invention.

The effectiveness of rotating registers is even more evident if data reuse can be exploited, where, for example, all or part of the data required by a computation already resides in the VEF, because it was needed or put there by a previous computation. This may be illustrated with respect to FIG. 4A, in which for each iteration i of an outer loop, an inner loop accesses M+3 elements of an array x residing in entries [i, i+1, . . . , i+M+2] of a VEF 400. FIG. 4A shows the pattern after unrolling the outer loop by 4, each outer-loop iteration shifting an interval 402 by four elements. The overlap that exists between the regions of array x that are accessed in different iterations of the outer loop may be seen. Thus, proper layout of the data in the VEF may take good advantage of data reuse for different operations having different data access patterns, without requiring the same elements to be reloaded multiple times.

Figure 4B:
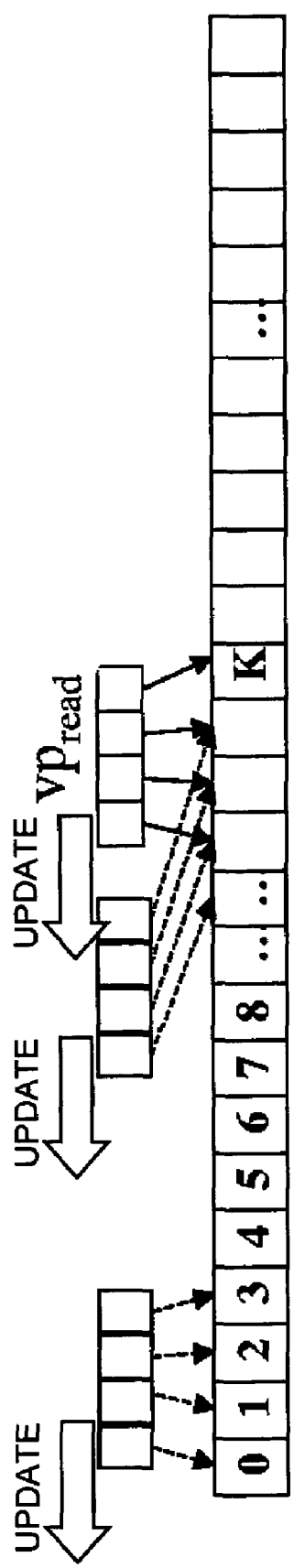

Although all N+M+3 elements of array x could be placed in the VEF if there are available VERs as depicted in FIG. 4A, a more compact layout may be used to achieve the same scheduling, flexibility, and reuse benefits, by streaming part of the data instead of pre-loading it. This is illustrated in FIG. 4B, where modulo arithmetic is used to wrap-around the same K VERs, where K<N+M+3. For example, if K=M+6, then after using elements 0,1,2,3 they may be replaced with elements M+7, M+8, M+9, M+10, and so on.

Figure 5B:
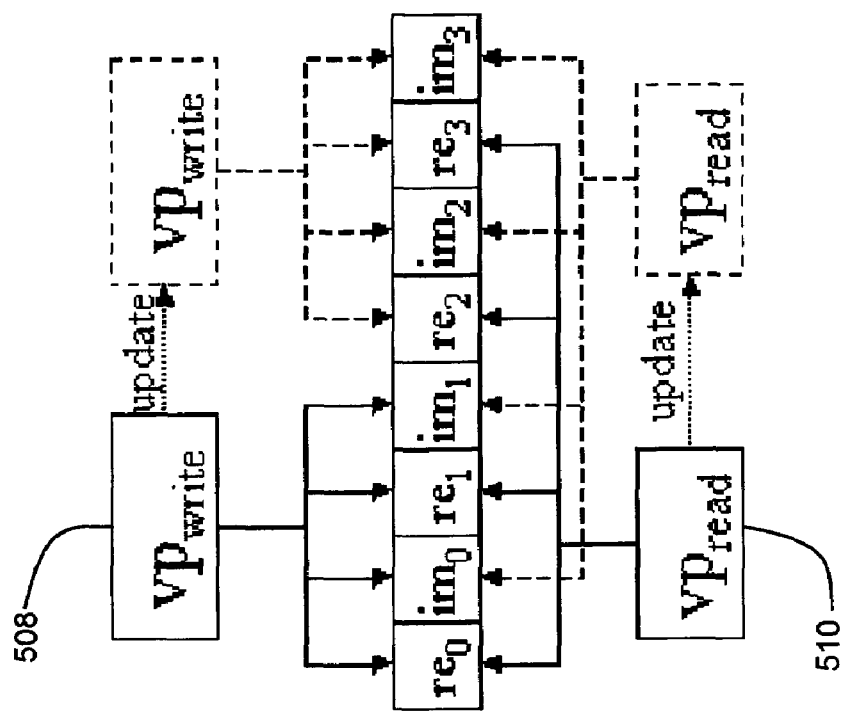
FIGS. 5A, 5B, and 5C are simplified conceptual illustrations of exemplary methods of VPR configuration, operative in accordance with a preferred embodiment of the present invention.
Figure 5A:
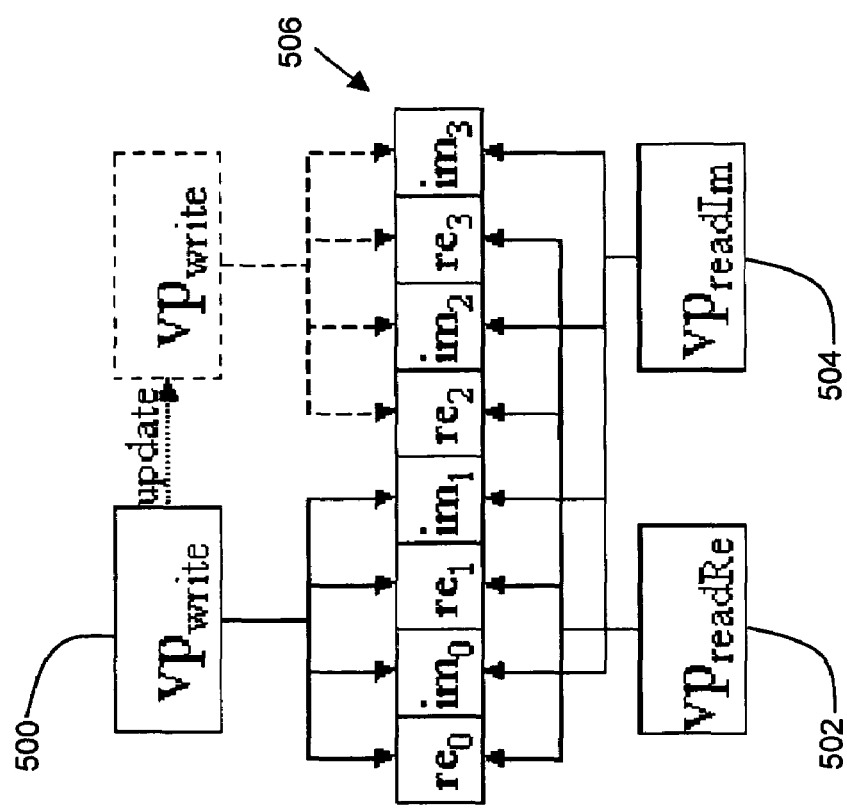
Figure 5C:
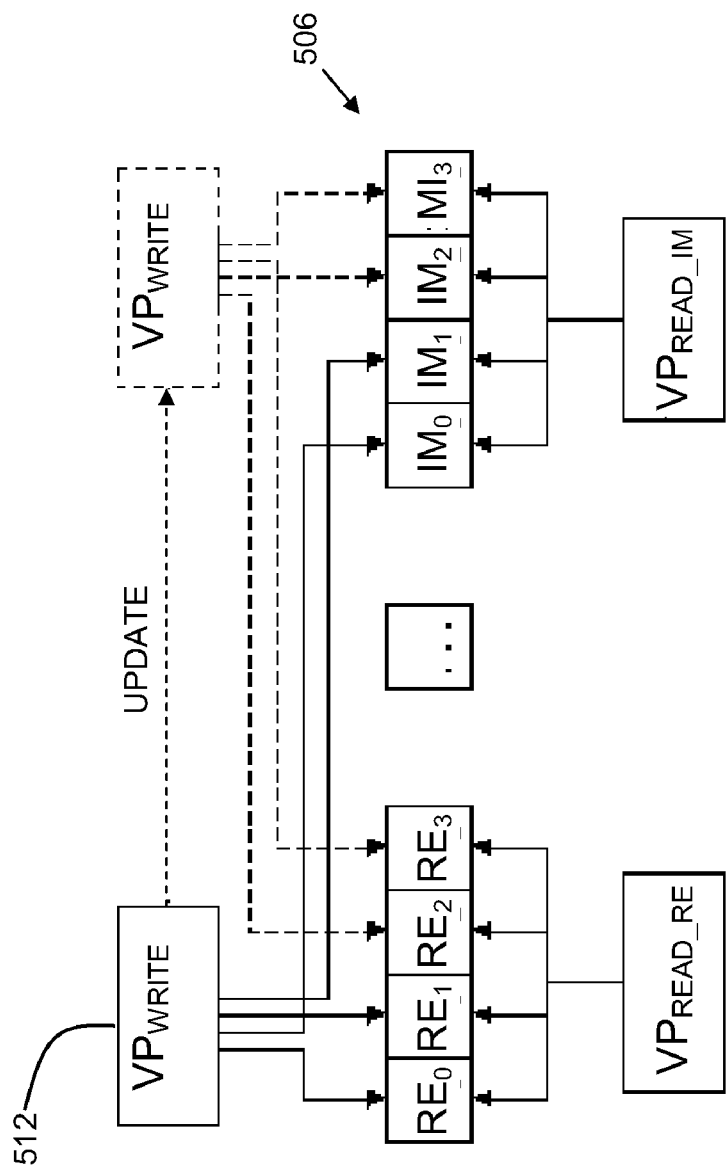

Reference is now made to FIGS. 5A, 5B, and 5C, which are simplified conceptual illustrations of exemplary methods of VPR configuration, operative in accordance with a preferred embodiment of the present invention. Reordering of data is typically called for when a memory access pattern indicates non-consecutive access of data, such as is expressed by the constant-stride pattern (d, d, d). A constant-stride pattern of d=2 typically appears in computations on complex numbers, such as in support of a Finite Impulse Response (FIR) filter expressed by:

$$Re(y_n) = \sum_{i=0}^{M-1} [Re(h_i)Re(x_{n-i}) - Im(h_i)Im(x_{n-i})],$$

$$Im(y_n) = \sum_{i=0}^{M-1} [Re(h_i)Im(x_{n-i}) + Im(h_i)Re(x_{n-i})].$$

In this example, the real and imaginary parts may be interleaved in the same input or output array. Complex inputs must be de-interleaved to carry out the SIMD computations, and complex outputs need to be re-interleaved. Decoders and encoders for interleaved codes and computations on very long data types also give rise to this pattern.

In FIG. 5A, VPRs 500, 502, and 504 are shown configured using "reorder on read" as follows for writing and reading interleaved data to and from a VEF 506 such that data need not be moved within registers to access an even tuple or an odd tuple:

$vp_{write}=(v, (1, 1, 1), 4, \infty)$ $vp_{readEven}=(v, (2, 2, 2), 8, \infty)$ $vp_{readOdd}=(v+1, (2, 2, 2), 8, \infty)$ Accordingly, VPRs may be configured to accommodate the multiplication instructions of the current example using four pointers, one for each real or imaginary part of each input array, using the following settings: (v1, (2, 2, 2), 8, 8), (v1+1, (2, 2, 2), 8, 8) and (v2, (2, 2, 2), 8, 8), (v2+1, (2, 2, 2), 8, 8), where, for every iteration, each VPR is used once without update and once with implicit update by 8.

In FIG. 5B, only two VPRs 508 and 510 are used in support of the same FIR memory access pattern using "reorder on read." In FIG. 5A, four VPRs were used for the multiplication instructions. As these VPRs have the same pattern (2, 2, 2), employing additional VPRs where available may be used to eliminate dependencies and produce more regular code by splitting each VPR into two, doubling the implicit update. The number of VPRs can also be reduced, using a smaller implicit update, but at the cost of an additional explicit update. In FIG. 5A, each iteration uses a single $vp_{read}$ instead of $vp_{readEven}$ and $vp_{readOdd}$, where $vp_{read}$ is set to (v1, (2, 2, 2), 1, $\infty$), and an explicit update of 7 is employed in every iteration.

In FIG. 5C, "reorder on write" is employed by placing the data non-consecutively into the VEF and reading it consecutively. The pattern of a $VP_{write}$ vector pointer 512 is (v0, ($\delta$, 1–$\delta$, $\delta$), 2, 8), where $\delta$=v1–v0. In the case of a (d, d, d) pattern with d dividing the vector length of 4, "reorder on write" requires a VEF allocation of d areas of a given size x each, rather than a single area of size dx as required by "reorder on read." Such a disjoint allocation might be preferred, depending on VEF availability and wrap-around mechanism restrictions.

The complex FIR example of FIGS. 5A-5C illustrates temporal and spatial reuse, where all the vector patterns are identical. However, the present invention may similarly be employed where several distinct vector patterns are used, all referring to the same data. One such example involves squaring a matrix, which requires accessing its elements along rows and along columns. Vector pointers can be used to implement such multiple accesses efficiently, without reordering the data itself.

Figure 6:
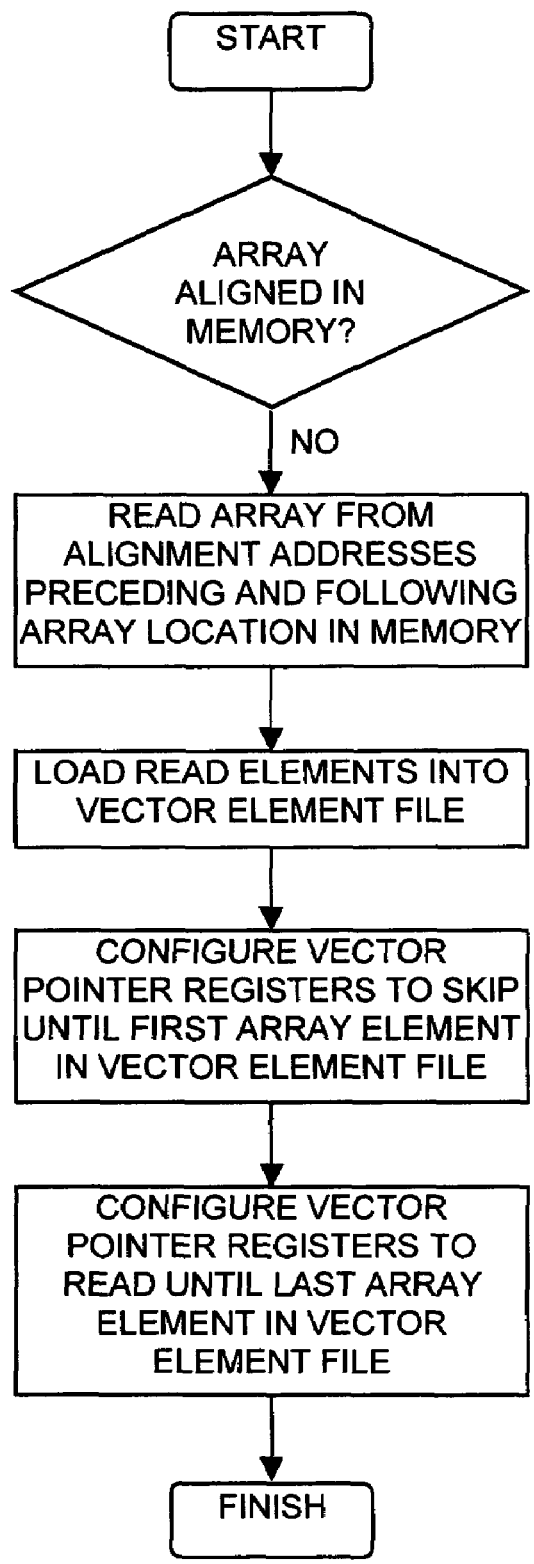
FIG. 6 is a simplified flowchart illustration of a method for compensating for memory alignment constraints, operative in accordance with a preferred embodiment of the present invention.

Reference is now made to FIG. 6, which is a simplified flowchart illustration of a method for compensating for memory alignment constraints, operative in accordance with a preferred embodiment of the present invention. Memory alignment constraints raise problems related to data reordering. Accessing a block of memory from a location which is not aligned on a certain boundary is often prohibited or bears a heavy performance penalty. The memory architecture in the eLite™ DSP, for example, restricts vector data access to 4 consecutive 16-bit elements in memory aligned on 64-bit boundary, with an option to disable storing any subset of elements.

In the method of FIG. 6, memory alignment problems may be treated as a special case of data reordering, where access to a contiguous data set is slightly shifted to comply with memory alignment constraints. In order to read from an array that is not aligned in memory using SIMdD, the array can be loaded into the VEF as if it starts at the nearest aligned address preceding the first element, and ends at the nearest aligned address following the last element. This may be accomplished by having one extra vector load instruction in the loop prologue that brings data from memory and places it in the VEF. While this may require some extra spaces in the VEF, the vector pointer pattern remains the same for all loads. The vector pointers used to read the loaded data from the VEF also retain the same pattern, but skip over the first n elements until the first desired element is reached. Storing data to unaligned memory locations may be handled similarly to loads, except that the first and last vector store instructions are masked appropriately so as not to write past the bounds of the target array. Arrays may thus be loaded and stored into unaligned memory locations using accesses to aligned memory only, with only a small constant overhead.

By way of example, the method of FIG. 6 may be illustrated with respect to an array h that is not properly aligned in memory. Array h is stored in memory starting at address s and ending at address t, where addresses are expressed in 16-bit units, t−s=|h|−1, b=s mod 4, and e=t mod 4. If b≠0 or e≠3, h cannot be read exactly from memory into the VEF as h is not properly aligned. To compensate for this, a properly aligned memory segment containing h is loaded into the VEF, starting from s−b until t+3−e. This may load at most six extra elements, whatever the length of array h. One may use, for example, $$vp_{write} = (A, (1, 1, 1), 4, \infty)$$

for writing into the VEF, and $$vp_{read} = (A+b, (1, 1, 1), 4, \infty),$$

for reading from the VEF, thus skipping the extra b elements at the beginning.

Figure 7:
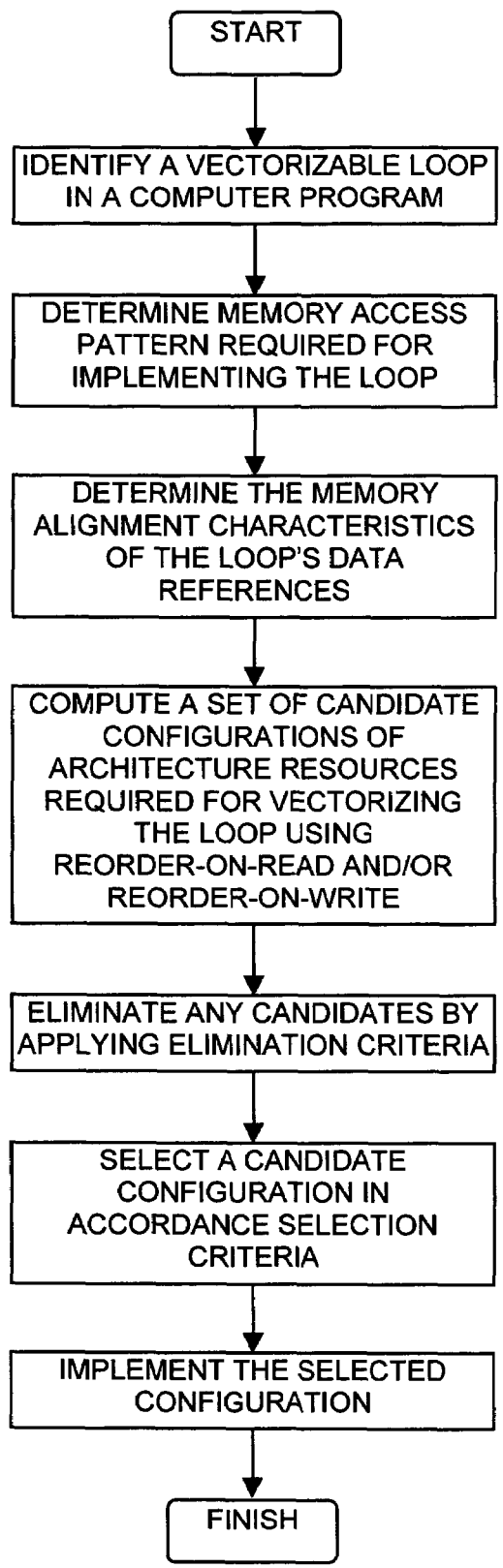
FIG. 7 is a simplified flowchart illustration of a method for determining vectorization configurations, operative in accordance with a preferred embodiment of the present invention.
Figure 8:
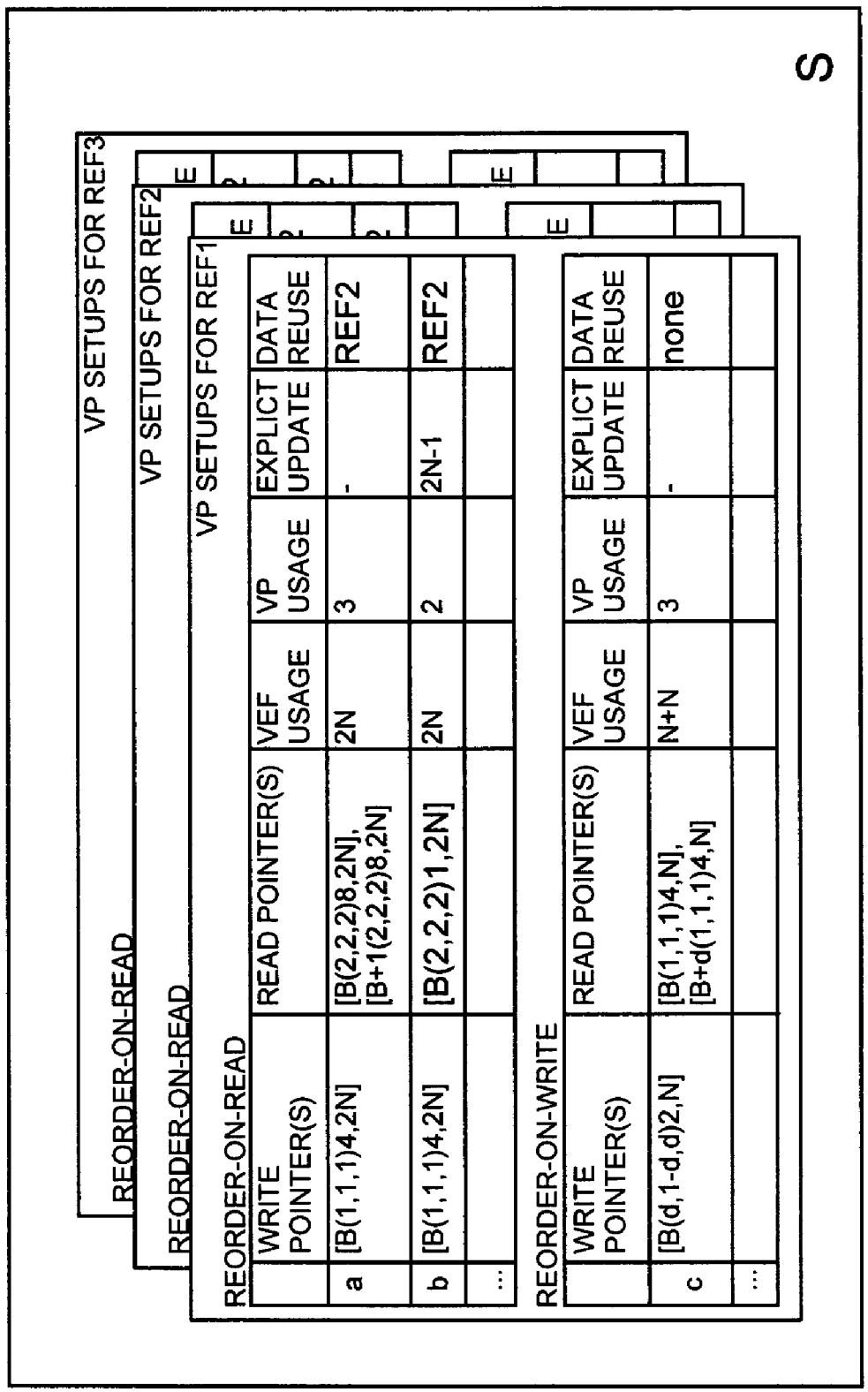
FIG. 8 is a simplified conceptual illustration of a table of candidate vectorization configurations, operative in accordance with a preferred embodiment of the present invention.

Reference is now made to FIG. 7, which is a simplified flowchart illustration of a method for determining vectorization configurations, operative in accordance with a preferred embodiment of the present invention. The method of FIG. 7 is preferably implemented as part of a compiler "vectorization" pass. In the method of FIG. 7, a vectorizable loop in a computer program is identified using conventional techniques, such as memory and data dependence analysis. Memory access patterns required for implementing the loop are then identified, as are the memory alignment characteristics of the loop's data references, and a set of candidate configurations of resources required for vectorizing the loop is computed, including vector pointer tuple configurations as described hereinabove, an example of which is shown in FIG. 8. For example, some candidate configurations may employ "reorder on read" while others employ "reorder on write." Different candidate configurations might also use different numbers of VPRs. Some candidate configurations might require the vector to be loaded contiguously into the VEF, while others might work with splitting the vector into one or more segments to be loaded non-contiguously into the VEF. Explicit updating of VPRs also may or may not be required. One candidate might be configured for data reuse without requiring data to be reloaded for reuse, while another would require data to be reloaded.

Multiple sets of vectorization configuration options may be generated for multiple vectorizable loops in the same computer program, allowing for cross-loop analysis and modification of configuration options as data reuse opportunities are detected.

Once the sets of candidate configurations of resources required for vectorization are generated, one or more candidates may be eliminated by applying predefined elimination criteria. For example, a candidate that requires non-contiguous loading into the VEF of n segments of size m each may be eliminated if the VEF cannot accommodate n segments or can only accommodate n segments that are smaller than m. Similarly, a candidate that requires three VPRs may be eliminated if only two are available. Once elimination criteria have been applied a configuration may be selected from the remaining set of configurations in accordance with predefined selection criteria and implemented for its corresponding loop. For example, a configuration that uses fewest VPRs might be preferred over one that uses multiple VEF segments. The code may then be transformed (e.g., unrolling, unroll-and-jam, variable expansion) and scalar operations may be replaced by their vectorized counterparts.

Figure 9:
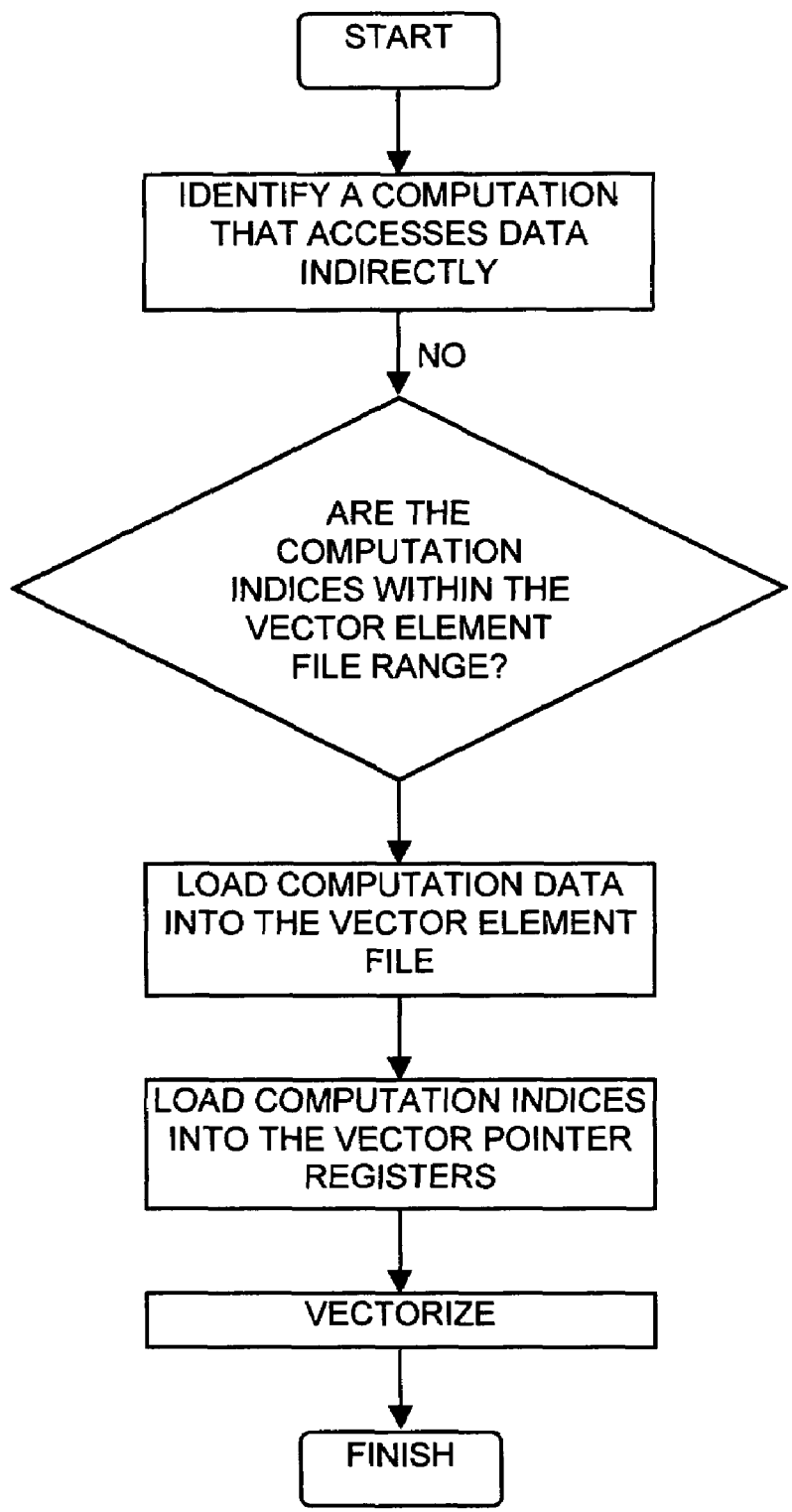
FIG. 9 is a simplified flowchart illustration of a method for determining vectorization configurations, operative in accordance with a preferred embodiment of the present invention.

Reference is now made to FIG. 9, which is a simplified flowchart illustration of a method for determining vectorization configurations, operative in accordance with a preferred embodiment of the present invention. The method of FIG. 9 is particularly suited for vectorizing computations that feature arbitrary parametric access, such as computations that operate in parallel on a permutation of data, e.g. c[i]=a[p[i]]+b[q[i]] for i=0 . . . N. For such computations to be operated on by an SIMD operation, the elements would typically be packed into a "vector" register in advance. In this configuration only consecutive elements can be loaded directly from memory into vector registers. While special permute operations can combine elements from two vector registers into a third, all registers must be specified explicitly. Thus, in the example above, if the contents of the p and/or q arrays are not known at code-generation time or compile time, it is not possible to group multiple accesses (e.g., 4 accesses) to multiple elements (e.g., 4 elements of a[ ]) into a single "load-vector" instruction, because it is not known in advance which elements are loaded at which time. Therefore, there is often no advantage to performing the computation other than in a serial manner. If the contents of arrays p and q are known at code-generation time or compile time, it is possible to vectorize the computation, however all permute operations would have to be generated explicitly, usually requiring the loop to be completely unrolled.

By contrast, in the method of FIG. 9 the architecture of the present invention may be employed to more efficiently vectorize computations that feature arbitrary parametric access. The method of FIG. 9 is preferably implemented as part of a compiler "vectorization" pass. In the method of FIG. 9 a computation that accesses data indirectly, such as a[p[i]] in the example above, may be detected using conventional standard techniques. The indices of the computation are then checked to determine that they are within the VEF range (e.g., max {p[i]}−min{p[i]}<=|VEF|). As the indices must fit within the size of the input arrays, it suffices to check that the input arrays (e.g., a[ ] and b[ ]) fit inside the VEF. All data are then loaded into the VEF (e.g., a[ ] and b[ ]), and the indices into the VPRs (e.g., p[ ] and q[ ]). The VPRs may then be used to access the data in the VEF using reorder-on-read as described hereinabove. In this manner, the indices (e.g., p[ ] and q[ ]) need not be known at code-generation time or compile time, and no loop-unrolling is required. Vectorization may then be performed. Thus, in the example above:

```
vpr_a = [A;A+1;A+2;A+3]; post-increment=4;
vpr_b = [B;B+1;B+2;B+3]; post-increment=4;
for (i=0; i<N; i+=4)
    {
        VEF(vpr_a++) = a[i;i+1;i+2;i+3];
        VEF(vpr_b++) = b[i;i+1;i+2;i+3];
    }
for (i=0; i<N; i+=4)
    {
        vpr1 = p[i;i+1;i+2;i+3];
        vpr2 = q[i;i+1;i+2;i+3];
        vpr3 = [100,101,102,103];
        VEF(vpr3) = VEF(A+vpr1) + VEF(B+vpr2);
        c[i;i+1;i+2;i+3] = VEF(vpr3);
    }
```

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for determining Single Instruction Multiple Data (SIMD) parallel execution configurations in a computer processor architecture, the method comprising:
identifying in a computer program one or more loops that are amenable to parallel execution on an SIMD processor;
identifying a memory access pattern of data required for implementing said loop in said architecture;
computing a set of candidate configurations of resources required for processing said data in said architecture, wherein said computing comprises configuring an indirect addressing vector pointer register of said architecture into a multiport, scalar register file containing independently addressable elements in support of either of reorder-on-read use and reorder-on-write use of a vector element file of said architecture;
selecting one of said candidate configurations in accordance with predefined selection criteria; and
implementing said SIMD parallel execution configuration in said architecture.

2. A method according to claim 1 where any of said method is implemented by a compiler.

3. A method according to claim 1 wherein said computing comprises configuring any of said vector pointer registers in support of loading a data vector into a plurality of non-contiguous segments of said vector element file of said architecture.

4. A method according to claim 1 wherein said computing comprises configuring any of said vector pointer registers in support of loading a data vector into said vector element file of said architecture in support of a plurality of operations where each operation has a different access pattern.

5. A method according to claim 4 and further comprising:
performing any of said method for a plurality of said loops in the same computer program;
detecting a data reuse opportunity common to two or more of said loops; and
modifying any of said candidate configuration in support of said data reuse opportunity.

6. A method according to claim 1 and further comprising eliminating any of said candidate configurations in accordance with predefined elimination criteria.

7. A method according to claim 6 wherein said eliminating comprises eliminating any of said candidate configurations that require loading a data vector into said vector element file in a manner that cannot be accommodated by said vector element file.

8. A method according to claim 1 wherein said selecting comprises selecting one of said candidate configurations that uses fewest vector pointer registers among all of said candidate configurations.

9. A method for determining Single Instruction Multiple Data (SIMD) parallel execution configurations in a computer processor architecture for computations that feature arbitrary parametric access, the method comprising:
identifying in a computer program one or more loops that accesse data indirectly and that are amenable to parallel execution on an SIMD processor;
determining that indices of said one or more loops fit within the range of a vector element file of said architecture, and, if so:
loading all loop data into said vector element file;
loading said indices into at least one indirect addressing vector pointer register of said architecture, said vector pointer register being configured into a multiport, scalar register file containing independently addressable elements in support of reorder-on-read use of said vector element file; and
processing said loop data.

10. A method according to claim 9 wherein said identifying comprises identifying said one or more loops as performing a plurality of computations that operate in parallel on a permutation of data.

11. A method according to claim 9 where any of said method is implemented by a compiler.

12. A system for determining Single Instruction Multiple Data (SIMD) parallel execution configurations in a computer processor architecture, the system comprising:
a processor with executable means for identifying in a computer programs, a loop that is amenable to parallel execution on an SIMD processor;
a processor with executable means for identifying a memory access pattern of data required for implementing said loop in said architecture;
a processor with executable means for computing a set of candidate configurations of resources required for processing said data in said architecture, wherein said means for computing is operative to configure each of one or more indirect addressing vector pointer registers, of said architecture, into a multiport, scalar register file containing independently addressable elements, in support of either of reorder-on-read use and reorder-on-write use of a vector element file of said architecture;
a processor with executable means for selecting one of said candidate configurations in accordance with predefined selection criteria; and
a processor with executable means for implementing said SIMD parallel execution configuration in said architecture.

13. A system according to claim 12 where any of said processor executable means are assembled with a compiler.

14. A system according to claim 12 wherein said processor executable means for computing is operative to configure any of said vector pointer registers in support of loading a data vector into a plurality of non-contiguous segments of said vector element file of said architecture.

15. A system according to claim 12 wherein said processor executable means for computing is operative to configure any of said vector pointer registers in support of loading a data vector into said vector element file of said architecture in support of a plurality of operations where each operation has a different access pattern.

16. A system according to claim 15 and further comprising:
processor executable means for executing SIMD parallel execution configurations for a plurality of loops in the same computer program;
processor executable means for detecting a data reuse opportunity common to two or more of said loops; and
processor executable means for modifying any of said candidate configurations in support of said data reuse opportunity.

17. A system according to claim 12 and further comprising processor executable means for eliminating any of said candidate configurations in accordance with predefined elimination criteria.

18. A system according to claim 17 wherein said processor executable means for eliminating is operative to eliminate any of said candidate configurations that requires loading a data vector into said vector element file in a manner that cannot be accommodated by said vector element file.

19. A system according to claim 12 wherein said processor executable means for selecting is operative to select one of said candidate configurations that uses the fewest vector pointer registers among all of said candidate configurations.

20. A system for determining Single Instruction Multiple Data (SIMD) parallel execution configurations in a computer processor architecture for computations that feature arbitrary parametric access, the system comprising:
   processor executable means for identifying in a computer program a loop that accesses data indirectly and that is amenable to parallel execution on an SIMD processor;
   processor executable means for determining that indices of said loop fit within the range of a vector element file of said architecture, and, if so:
   processor executable means for loading all loop data into said vector element file;
   processor executable means for loading said indices into at least one indirect addressing vector pointer register of said architecture, said vector pointer register being configured into a multiport, scalar register file containing independently addressable elements in support of reorder-on-read use of said vector element file; and
   processor executable means for processing said loop data.

21. A system according to claim 20 wherein said processor executable means for identifying is operative to identify said loop as performing a plurality of computations that operate in parallel on a permutation of data.

22. A system according to claim 20 where any of said processor executable means are assembled with a compiler.

23. A computer program embodied on a computer-readable medium, the computer program comprising:
   a first code segment operative to identify in a computer program a loop that is amenable to parallel execution on an SIMD processor in a computer processor architecture;
   a second code segment operative to identify a memory access pattern of data required to implement said loop in said architecture;
   a third code segment operative to compute a set of candidate configurations of resources required for processing said data in said architecture and configure an indirect addressing vector pointer register of said architecture into a multiport, scalar register file containing independently addressable elements in support of either of reorder-on-read use and reorder-on-write use of a vector element file of said architecture;
   a fourth code segment operative to select one of said candidate configurations in accordance with predefined selection criteria; and
   a fifth code segment operative to implement said SIMD parallel execution in said architecture.

24. A computer program according to claim 23 where any of said code segments are assembled with a compiler.

25. A computer program according to claim 23 wherein said third code segment is operative to configure any of said vector pointer registers in support of loading a data vector into a plurality of non-contiguous segments of said vector element file of said architecture.

26. A computer program according to claim 23 wherein said third code segment is operative to configure any of said vector pointer registers in support of loading a data vector into said vector element file of said architecture in support of a plurality of operations where each operation has a different access pattern.

27. A computer program according to claim 26 and further comprising:
   a sixth code segment operative to execute a plurality of loops in the same computer program;
   a seventh code segment operative to detect a data reuse opportunity common to two or more of said loops; and
   an eighth code segment operative to modify any of said candidate configurations in support of said data reuse opportunity.

28. A computer program according to claim 23 and further comprising a ninth code segment operative to eliminate any of said candidate configurations in accordance with predefined elimination criteria.

29. A computer program according to claim 28 wherein said ninth code segment is operative to eliminate any of said candidate configurations that require loading a data vector into said vector element file in a manner that cannot be accommodated by said vector element file.

30. A computer program according to claim 23 wherein said fourth code segment is operative to select one of said candidate configurations that uses fewest vector pointer registers among all of said candidate configurations.

31. A computer program embodied on a computer-readable medium, the computer program comprising:
   a first code segment operative to identify in a computer program a loop that accesses data indirectly and that is amenable to parallel execution on an SIMD processor in a computer processor architecture;
   a second code segment operative to determine that indices of said loop fit within the range of a vector element file of said architecture, and, if so, load all loop data into said vector element file;
   a third code segment operative to load said indices into at least one indirect addressing vector pointer register of said architecture, said vector pointer register being configured into a multiport, scalar register file containing independently addressable elements in support of reorder-on-read use of said vector element file; and
   a fourth code segment operative to process said loop data.

32. A computer program according to claim 31 wherein said first code segment is operative to identify said loop as performing a plurality of computations that operate in parallel on a permutation of data.

33. A computer program according to claim 31 where any of said code segments are assembled with a compiler.

* * * * *